(12) United States Patent
Röhr et al.

(10) Patent No.: US 11,162,406 B2
(45) Date of Patent: Nov. 2, 2021

(54) PROCESS FOR MANUFACTURING AN EXHAUST SYSTEM

(71) Applicant: Eberspächer Exhaust Technology GmbH, Neunkirchen (DE)

(72) Inventors: Benjamin Röhr, Esslingen (DE); Damir Krajinovic, Esslingen (DE); Thomas Müller, Breitenbach (DE); Frank Hempel, Bexbach (DE); Benjamin Deuscher, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 52 days.

(21) Appl. No.: 16/689,549

(22) Filed: Nov. 20, 2019

(65) Prior Publication Data

US 2020/0165955 A1     May 28, 2020

(30) Foreign Application Priority Data

Nov. 23, 2018 (DE) ...................... 10 2018 129 506.5

(51) Int. Cl.
*F01N 13/00* (2010.01)
*F01N 13/18* (2010.01)
(Continued)

(52) U.S. Cl.
CPC .......... *F01N 13/008* (2013.01); *F02B 77/086* (2013.01); *F02D 41/1439* (2013.01); *F01N 13/1872* (2013.01)

(58) Field of Classification Search
CPC ...... F01N 13/008; F01N 13/18; F01N 13/185; F01N 13/1805; F01N 13/1872;
(Continued)

(56) References Cited

U.S. PATENT DOCUMENTS

2002/0125297 A1   9/2002   Stol et al.
2007/0160510 A1*   7/2007   Schultz ................... B21J 5/066
                                                                         422/177

(Continued)

FOREIGN PATENT DOCUMENTS

CN       201529847 U     7/2010
CN       201529848 U     7/2010
(Continued)

*Primary Examiner* — Audrey B. Walter
*Assistant Examiner* — Dapinder Singh
(74) *Attorney, Agent, or Firm* — McGlew and Tuttle, P.C.

(57) ABSTRACT

A process for manufacturing an exhaust system, especially for an internal combustion engine of a vehicle, includes providing an exhaust gas-guiding component (26) with a wall (38) made of a metallic material and providing a sensor-mounting connector (22), to be fixed at the wall. The sensor-mounting connector includes a sensor-mounting area (28) to be positioned outside the exhaust gas-guiding component, and a connection area (34), which is to be positioned such that the connection area meshes with the wall. The connection area is pressed against an outer surface (40) of the wall of the exhaust gas-guiding component in a fastening area (39) of the wall, and at the same time rotated about a longitudinal axis (A) of the connector to penetrate into the material forming the wall and a connection in substance is established between the metallic material of the wall and the metallic material of the sensor-mounting connector.

20 Claims, 2 Drawing Sheets

(51) Int. Cl.
*F02B 77/08* (2006.01)
*F02D 41/14* (2006.01)

(58) Field of Classification Search
CPC ............ F01N 2530/02; F01N 2530/04; F01N 2450/22; F02B 77/086; F02D 41/1439; B23K 20/12; B23K 20/227; B23K 20/1295; B23K 2101/006; B23K 2101/06; B21J 5/066
USPC .................................................. 60/274, 277
See application file for complete search history.

(56) References Cited

U.S. PATENT DOCUMENTS

| | | | |
|---|---|---|---|
| 2007/0178026 A1* | 8/2007 | Roth | B01D 53/9454 422/177 |
| 2008/0196781 A1* | 8/2008 | Grescher | F01N 13/08 138/106 |
| 2016/0216145 A1* | 7/2016 | Berberig | B23K 26/282 |

FOREIGN PATENT DOCUMENTS

| | | | |
|---|---|---|---|
| CN | 102728949 A | 10/2012 | |
| CN | 202851119 U | 4/2013 | |
| CN | 103813876 A | 5/2014 | |
| CN | 104718046 A | 6/2015 | |
| DE | 10 2005 018 881 A1 | 10/2006 | |
| DE | 10 2013 103 808 A1 | 10/2014 | |
| DE | 10 2013 015038 A1 | 3/2015 | |
| EP | 2 905 091 A1 | 8/2015 | |
| JP | 2002004854 A | 1/2002 | |
| JP | 2007023850 A | 2/2007 | |
| JP | 2008 019 753 A | 1/2008 | |

\* cited by examiner

PROCESS FOR MANUFACTURING AN EXHAUST SYSTEM

CROSS REFERENCE TO RELATED APPLICATIONS

This application claims the benefit of priority under 35 U.S.C. § 119 of German Application 10 2018 129 506.5, filed Nov. 23, 2018, the entire contents of which are incorporated herein by reference.

TECHNICAL FIELD

The present invention pertains to a process for manufacturing an exhaust system, which can be used, for example, in a vehicle in order to discharge the combustion waste gases emitted by an internal combustion engine into the environment.

TECHNICAL BACKGROUND

In order to ensure that an internal combustion engine or/and exhaust gas treatment devices contained in such an exhaust system, for example, particle filters, oxidation catalytic converters or SCR catalytic converters, operate with the lowest possible pollutant emission, it is necessary to provide different pieces of information pertaining to the exhaust gas in the area of such an exhaust system. This pertains, for example, to information representing, for example, the exhaust gas temperature or the exhaust gas composition. Sensors, which provide such information and can interact with the exhaust gas flowing in the exhaust system, may be provided for this purpose in the area of the exhaust system.

SUMMARY

An object of the present invention is to provide a process for manufacturing an exhaust system, with which process structural measures can be provided in a simple manner for arranging one or more sensors at the exhaust system.

This object is accomplished according to the present invention by a process for manufacturing an exhaust system, especially for an internal combustion engine of a vehicle, comprising the following steps:
 a) Provision of an exhaust gas-guiding component with a wall built from a metallic material,
 b) provision of a sensor-mounting connector consisting of a metallic material, which is to be fixed to the wall of the exhaust gas-guiding component, wherein the sensor-mounting connector comprises a sensor-mounting area to be positioned at least partially outside the exhaust gas-guiding component and a connection area positioned such that it meshes with the wall of the exhaust gas-guiding component, and
 c) pressing of the sensor-mounting connector with its connection area against an outer surface of the wall of the exhaust gas-guiding component in a fastening area of the wall, which fastening area is intended for fixing the sensor-mounting connector and at the same time rotation of the sensor-mounting connector about a longitudinal axis of the connector such that at least the connection area of the sensor-mounting connector penetrates into the material forming the wall of the exhaust gas-guiding component and a connection in substance is established between the metallic material of the wall and the metallic material of the sensor-mounting connector.

In the process according to the present invention, a sensor-mounting connector is recessed in the wall of the exhaust gas-guiding component in the manner of a so-called flow-drill process. Based on the pressure and the rotation of the sensor-mounting connector and on the frictional interaction developing in the process between the sensor-mounting connector and the wall of the exhaust gas-guiding component, the wall of the exhaust gas-guiding component is primarily melted, so that the sensor-mounting connector can penetrate through this. Since the sensor-mounting connector is also made of a metallic material, the material forming the sensor-mounting connector can establish a connection in substance with the material forming the wall of the exhaust gas-guiding component when the sensor-mounting connector has reached its intended desired installation position in relation to the wall of the exhaust gas-guiding component and its rotation has been ended. Further steps for establishing a connection in substance, for example, the carrying out of a welding operation, are then unnecessary.

Since an opening is prepared in the wall of the exhaust gas-guiding component during the penetration of the sensor-mounting connector in the process according to the present invention, it is proposed for a manufacturing process that can be carried out in the simplest possible manner that no opening be formed in the wall for mounting the sensor-mounting connector before step c) is carried out in the fastening area, i.e., the fastening area is provided at first without an opening.

Provisions may also be made for the exhaust gas-guiding component to be provided in the fastening area with a curved outer surface in step a). This means that no flattening of the pipe needs to be produced in the fastening area if, for example, the exhaust gas-guiding component is configured as a pipe, due to a bead-like edge area of an opening receiving the sensor-mounting connector being formed in the wall of the exhaust gas-guiding component by material being displaced during the insertion of the sensor-mounting connector, and based on the fact that the material forming the wall is melted in this state and is consequently flowable and conforms to the geometry of the sensor-mounting connector.

The penetration of the sensor-mounting connector into the material forming the wall of the exhaust gas-guiding component can be supported by the sensor-mounting connector being prepared in step b) with a connection area tapering in the manner of a tip. Provisions may be made, for example, for the sensor-mounting connector to be provided with a connection area with a frustoconical outer circumferential contour.

In order to support a defined positioning of the sensor-mounting connector in relation to the wall, the sensor-mounting connector may be provided in step b) with a transition area adjoining the connection area and with the sensor-mounting area adjoining the transition area and being radially expanded in relation to the transition area. The transition area may be prepared, for example, with a cylindrical outer circumferential contour and it can pass over into the sensor-mounting area in a step-like expansion.

In an alternative embodiment, it is possible to do away with such a transition area and to prepare the sensor-mounting connector in step b) with the sensor-mounting area adjoining the connection area. Provisions may be made for this purpose, for example, for the connection area to have in its axial end area adjoining the sensor-mounting area an external dimension corresponding to the external dimension of the area.

Especially the material forming the wall of the exhaust gas-guiding component is melted by the rotation process carried out under pressure and by the heat due to friction, which is generated in the process, so that the sensor-mounting connector can penetrate in relation to the wall. As long as the sensor-mounting connector is rotating in relation to the wall, a connection in substance cannot become established between these two components. It is therefore further proposed that the rotation of the sensor-mounting connector about the longitudinal axis of the connector be ended in step c) when the sensor-mounting connector reaches a desired installation position in relation to the wall of the exhaust gas-guiding component. When the sensor-mounting connector is then positioned in the desired installation position in relation to the wall but is not moving any longer in relation to this wall, the materials of these two components can melt together in their surface areas in which they adjoin each other based on the very high temperature, which these will have in this state, and they can generate a connection in substance in this manner.

In order to guarantee a uniform interaction over the circumference between the sensor-mounting connector and the wall during the rotation of the sensor-mounting connector, it is proposed that the sensor-mounting connector be provided with an essentially rotationally symmetrical outer circumferential contour at least in its length area that is to be positioned such that it meshes with the wall or passes through this wall.

The wall of the exhaust gas-guiding component may be made, for example, from a sheet metal material. The sensor-mounting connector may preferably be made from an austenitic stainless steel material.

The present invention will be described below in detail with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
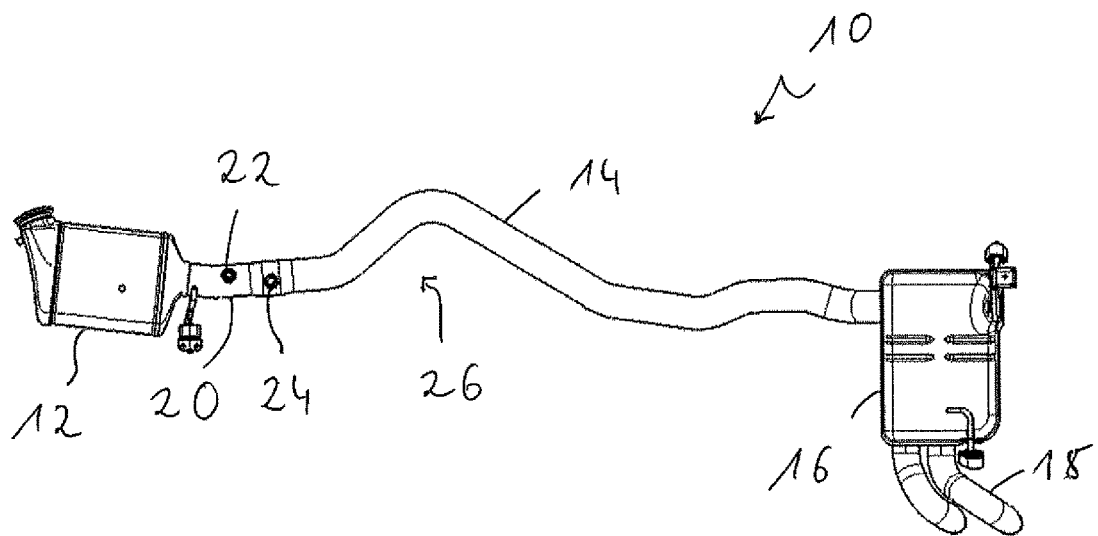
FIG. 1 is an exhaust system for an internal combustion engine of a vehicle.

Referring to the drawings, FIG. 1 shows an example of an exhaust system generally designated by 10 for an internal combustion engine in a vehicle. An exhaust gas treatment device, generally designated by 12, comprising, for example, a particle filter, a catalytic converter unit or the like, is arranged in an upstream area of the exhaust system 10. A pipeline 14 then following carries the exhaust gas released from the exhaust gas treatment device 12 to an exhaust muffler 16 positioned in the downstream end area. The exhaust gas is then released from the exhaust muffler 16 into the environment via one or more tail pipes 18.

Sensor-mounting connectors 22, 24 are provided in two positions in a pipe section 20 of the pipeline 14, which said pipe section follows the exhaust gas treatment device 12. Sensors, for example, a temperature sensor and an NOx sensor, may be arranged in the area of these sensor-mounting connectors 22, 24 such that they interact with the exhaust gas flowing in the pipeline 14 and thus provide information on this exhaust gas.

Figure 2:
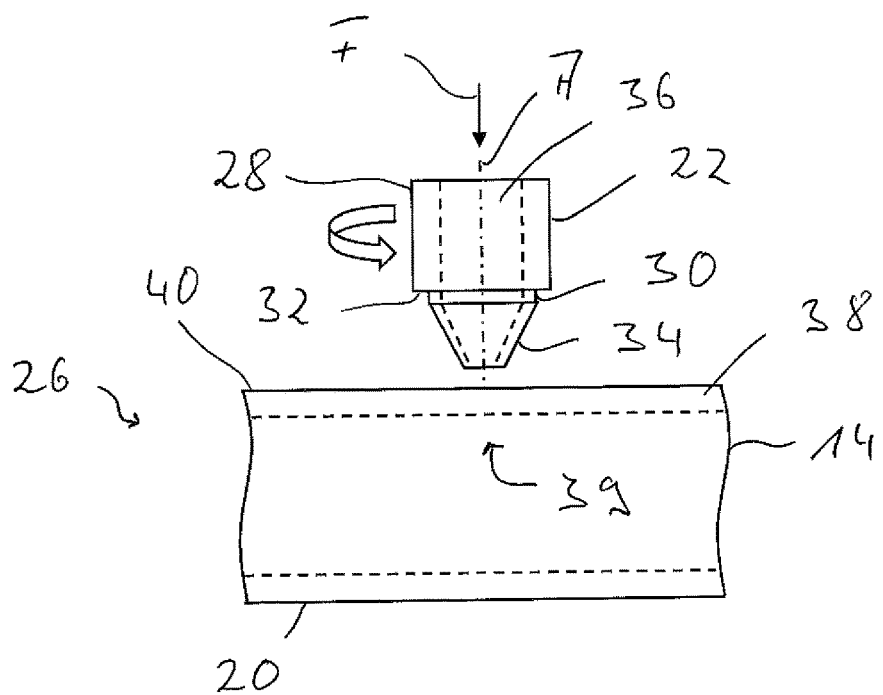
FIG. 2 is a sensor-mounting connector to be connected to an exhaust gas-guiding component.

FIG. 2 shows, for example, on the basis of the sensor-mounting connector 22, how this is connected in a simple manner to the pipeline 14, which shall generally be considered to be an exhaust gas-guiding component 26.

In the exemplary embodiment shown in FIG. 2, the sensor-mounting connector 22 has a sensor-mounting area 28, which has an essentially cylindrical shape on its outer circumference, is configured, for example, with a circular circumferential contour, and is elongated in the direction of a longitudinal axis A of the connector. A transition area 30, which is, for example, likewise cylindrically and rotationally symmetrical, has, for example, a circular shape and passes over into the sensor-mounting area 28, which the sensor-mounting area 28 has a larger diameter in the area of a step-like radial expansion 32, is provided following the sensor-mounting area 28 in the axial direction. The transition area 30 is adjoined by a connection area 34, which likewise has a rotationally symmetrical outer circumferential contour. The connection area 34 forms a tip of the sensor-mounting connector 22 and is configured with a frustoconical taper starting, for example, from the transition area 30.

An opening 36 passing completely through the sensor-mounting connector 22 is provided in the interior of said sensor-mounting connector 22. A sensor can be inserted into this opening especially in the sensor-mounting area 28. The opening 36 may be provided for this purpose with an internal thread in, for example, its area extending in the sensor-mounting area 28, so that a sensor configured complementarily with an external thread can be screwed into the sensor-mounting connector 22. Adapted to the tapering contour of the connection area 34, the opening 36 also has a tapering configuration in the area of the connection area 34. The opening 36 is open at the axial end located at a distance from the sensor-mounting area 28, so that a sensor carried in the sensor-mounting connector 22 can interact via this area of the opening 36 with the exhaust gas flowing in the line section 20.

For a firm connection of the sensor-mounting connector 22 to the pipeline 14 or to a wall 38 of the pipeline 14 forming the exhaust gas-guiding component 26 in a fastening area 39, the sensor-mounting connector 22 is clamped into a rotating tool and is driven for the rotation about the longitudinal axis A of the connector at a speed in the range of 500 revolutions per minute to 1,500 revolutions per minute. A force F acting in the direction of the longitudinal axis A of the connector in the range of 800 N to 1,000 N now acts on the sensor-mounting connector 22 and the sensor-mounting connector is thus pressed against an outer circumferential surface 40 of the wall 38 in the fastening area 39. The material of the wall 38 is heated by the heat developing due to the friction in the process to the extent that this material melts and the connection area 34 of the sensor-mounting connector 22 can penetrate through the wall 38.

Figure 3:
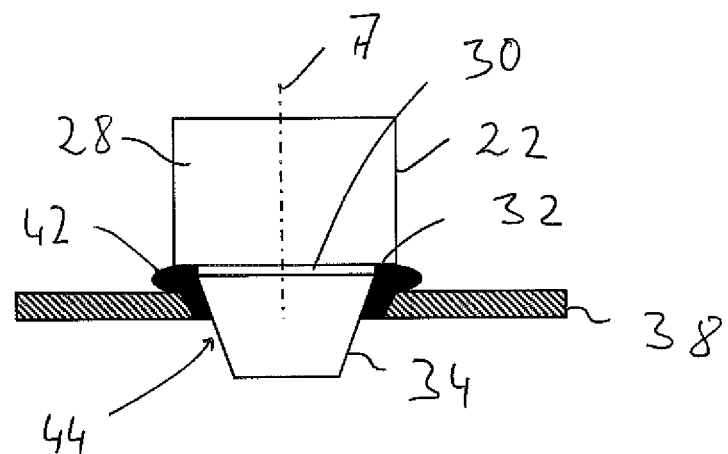
FIG. 3 is the sensor-mounting connector shown in FIG. 2 after the sensor-mounting connector has been connected to the exhaust gas-guiding component.

As is shown in FIG. 3, melted material of the wall 38, which is shown in black in this view, will now also yield outwards and form a bead-like edge area 42. If the sensor-mounting connector 22 approaches this bead-like edge area 42 consisting of still melted material of the wall 38 during this phase with a stepwise radial expansion 32, this bead-like edge area 42 becomes adapted to the shape of the step-like radial expansion 32 and also of the transition area 30 and of the section of the connection area 34, which said section passes through the wall 38. In particular, a contact of the bead-like edge area 42 with the step-like radial expansion 32, which contact preferably extends without interruptions in the circumferential direction around the longitudinal axis A of the connector, will develop now.

If the sensor-mounting connector 22 reaches a desired installation position in relation to the wall 38 in the course of the axial displacement motion of the sensor-mounting connector 22, the speed at which the sensor-mounting connector 22 rotates about the longitudinal axis A of the connector is gradually reduced until the rotation is ended and the sensor-mounting connector 22 does not continue to be displaced axially in relation to the wall 38, nor does it rotate about the longitudinal axis A of the connector in relation to the wall 38. The materials forming the wall 38, on the one hand, and the sensor-mounting connector 22, on the other hand, are still so hot in this state in their mutually adjoining surface areas that they can melt together and form a connection in substance. This connection in substance extends circumferentially without interruptions in the circumferential direction about the longitudinal axis A of the connector and thus it provides a completely gas-tight connection of the sensor-mounting connector 22 to the wall 38 in an opening 44 formed therein wall. The sensor-mounting connector 22 passes in this state with a part of its connection area 34 through the wall 38 and into the internal volume of the line section 20 of the pipeline 14. As was already described above, the sensor-mounting connector 22 with its opening 36 formed therein is axially open in this area, so that a sensor then inserted subsequently into the sensor-mounting connector 22 can interact with the exhaust gas flowing in the pipeline 14 and provide information on it.

Figure 4:
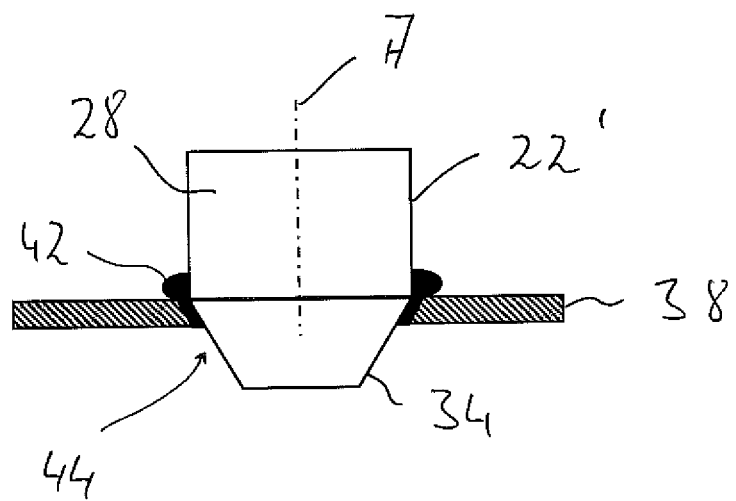
FIG. 4 is a view corresponding to FIG. 3 with an alternative shape of the sensor-mounting connector.

An alternative embodiment of a sensor-mounting connector 22' is shown in FIG. 4. It is seen that the connection area 34 passes over into the sensor-mounting area 28 essentially continuously and without a transition area in this embodiment. The connection area 34 is configured with the same circumferential dimension, i.e., for example, diameter in case of a circular configuration, as the sensor-mounting area 28 especially where the connection area 34, which tapers, for example, in a frustoconical manner, adjoins the sensor-mounting area 28 configured with an essentially cylindrical outer circumferential shape.

In the process for inserting the sensor-mounting connector 22' into the wall 38, which was described above with reference to FIGS. 2 and 3, the sensor-mounting connector 22' shown in FIG. 4 can be pushed, for example, with its sensor-mounting area 28, into the area of the bead-like edge area 42, and possibly also into the area of the wall 38. It would also be possible to push the sensor-mounting connector 22' farther through the opening 44 formed in the wall 38, so that, for example, the essentially cylindrically shaped sensor-mounting area 28 will also pass nearly completely or completely through the wall 38 and still project towards the interior of the line section 20. In this case, the connection area 34 has essentially the function of recessing the opening in the wall 38 in the course of the process for establishing the connection, while the connection in substance is established between the sensor-mounting connector 22' and the wall 38 in the part of the sensor-mounting area 28 that extends partially into or through the wall 38.

It is not necessary in the procedure according to the present invention for manufacturing an exhaust system, especially for connecting a sensor-mounting connector to an exhaust gas-guiding component of the exhaust system, to prepare an opening, which will then receive the sensor-mounting connector, for example, by laser cutting or other machining operations, before the insertion of a sensor-mounting connector in a wall of an exhaust gas-guiding component. It is also unnecessary to prepare, in a flattened area, in which a sensor-mounting connector shall be arranged, a flattened area for providing an essentially uncurved plateau area, at which a step-like radial expansion can then be positioned in contact with the sensor-mounting connector essentially over the entire circumference, in order subsequently to achieve a gas-tight connection of the connector to the wall of the exhaust gas-guiding component in this area by preparing a weld seam. The procedure according to the present invention does not require all these additional preparatory procedures and it makes it possible to arrange a sensor-mounting connector in nearly any desired position of exhaust gas-guiding components manufactured from metallic material. Such an exhaust gas-guiding component may consequently be, as is shown in FIG. 1, for example, a pipeline, but it may also be, as an alternative, a wall of an exhaust gas treatment device, of an exhaust muffler or the like.

To establish a stable connection in substance with the procedure according to the present invention, the wall of the exhaust gas-guiding component may be made, for example, from a sheet metal material, while the sensor-mounting connector may be made, for example, from an austenitic stainless steel. Further, it is, of course, also possible with the procedure according to the present invention to arrange a plurality of sensor-mounting connectors at an exhaust gas-guiding component. The above-described process steps may be carried out or repeated for this purpose individually for each sensor-mounting connector to be arranged at an exhaust gas-guiding component.

While specific embodiments of the invention have been shown and described in detail to illustrate the application of the principles of the invention, it will be understood that the invention may be embodied otherwise without departing from such principles.

What is claimed is:

1. A process for manufacturing an exhaust system, the process comprising the steps of:
   providing an exhaust gas-guiding component with a wall made of a metallic material;
   providing a sensor-mounting connector made of a metallic material, which sensor-mounting connector is to be fixed to the wall of the exhaust gas-guiding component, wherein the sensor-mounting connector comprises a sensor-mounting area to be positioned at least partially outside of the exhaust gas-guiding component and a connection area to be positioned such that the connection area meshes with the wall of the exhaust gas-guiding component; and
   pressing the sensor-mounting connector to press the connection area against an outer surface of the wall of the exhaust gas-guiding component in a fastening area of the wall, which fastening area is intended for fixing the sensor-mounting connector, and at the same time rotating the sensor-mounting connector about a longitudinal axis of the sensor-mounting connector such that at least the connection area of the sensor-mounting connector penetrates into the metallic material forming the wall of the exhaust gas-guiding component and establishing a connection in substance between the metallic material of the wall and the metallic material of the sensor-mounting connector, wherein no opening is formed in the wall for mounting the sensor-mounting connector before carrying out the step of pressing the sensor-mounting connector and at the same time rotating the sensor-mounting connector.

2. A process in accordance with claim 1, wherein the provided exhaust gas-guiding component is prepared in the fastening area with a curved outer surface.

3. A process in accordance with claim 1, wherein the provided exhaust gas-guiding component is prepared in the fastening area with a curved outer surface.

4. A process in accordance with claim 1, wherein the provided sensor-mounting connector is prepared with a connection area tapering to provide a tip.

5. A process in accordance with claim 4, wherein the sensor-mounting connector is prepared with a connection area with a frustoconical outer circumferential contour.

6. A process in accordance with claim 1, wherein:
the provided sensor-mounting connector is prepared with a transition area adjoining the connection area and adjoining the sensor-mounting area; and
the sensor-mounting area is expanded radially in relation to the transition area.

7. A process in accordance with claim 6, wherein the transition area is prepared with a cylindrical outer circumferential contour.

8. A process in accordance with claim 7, wherein the transition area passes over into the sensor-mounting area in a step expansion.

9. A process in accordance with claim 6, wherein the transition area passes over into the sensor-mounting area in a step expansion.

10. A process in accordance with claim 1, wherein the provided sensor-mounting connector is prepared with the sensor-mounting area adjoining the connection area.

11. A process in accordance with claim 10, wherein the connection area has an external dimension corresponding to an external dimension of the sensor-mounting area in a connection area axial end area adjoining the sensor-mounting area.

12. A process in accordance with claim 1, wherein the rotation of the sensor-mounting connector about the longitudinal axis of the connector is ended in step when the sensor-mounting connector reaches a desired installation position in relation to the wall of the exhaust gas-guiding component.

13. A process in accordance with claim 1, wherein the sensor-mounting connector is prepared with an essentially rotationally symmetrical outer circumferential contour at least in a length area, which essentially rotationally symmetrical outer circumferential contour is to be positioned such that the essentially rotationally symmetrical outer circumferential contour meshes with the wall or passes through said wall.

14. A process in accordance with claim 1, wherein:
the wall of the exhaust gas-guiding component is made of a sheet metal material; or
the sensor-mounting connector is made of an austenitic stainless steel material; or
the wall of the exhaust gas-guiding component is made of a sheet metal material and the sensor-mounting connector is made of an austenitic stainless steel material.

15. A process in accordance with claim 1, wherein the connection in substance is established between the metallic material of the wall and the metallic material of the sensor-mounting connector by a portion of the metallic material of the wall and the metallic material of the sensor-mounting connector melting with the step of pressing the sensor-mounting connector and at the same time rotating the sensor-mounting connector and subsequently solidifying.

16. An exhaust system formed by the steps of:
providing an exhaust gas-guiding component with a wall made of a metallic material;
providing a sensor-mounting connector made of a metallic material, which sensor-mounting connector is to be fixed to the wall of the exhaust gas-guiding component, wherein the sensor-mounting connector comprises a sensor-mounting area to be positioned at least partially outside of the exhaust gas-guiding component and a connection area to be positioned such that the connection area meshes with the wall of the exhaust gas-guiding component; and
pressing the sensor-mounting connector to press the connection area against an outer surface of the wall of the exhaust gas-guiding component in a fastening area of the wall, which fastening area is intended for fixing the sensor-mounting connector, and at the same time rotating the sensor-mounting connector about a longitudinal axis of the sensor-mounting connector such that at least the connection area of the sensor-mounting connector penetrates into the metallic material forming the wall of the exhaust gas-guiding component and establishing a connection in substance between the metallic material of the wall and the metallic material of the sensor-mounting connector, wherein no opening is formed in the wall for mounting the sensor-mounting connector before carrying out the step of pressing the sensor-mounting connector and at the same time rotating the sensor-mounting connector.

17. An exhaust system in accordance with claim 16, wherein the provided exhaust gas-guiding component is prepared in the fastening area with a curved outer surface.

18. An exhaust system in accordance with claim 16, wherein the connection in substance is established between the metallic material of the wall and the metallic material of the sensor-mounting connector by a portion of the metallic material of the wall and the metallic material of the sensor-mounting connector melting with the step of pressing the sensor-mounting connector and at the same time rotating the sensor-mounting connector and subsequently solidifying.

19. An exhaust system formed by the steps of:
providing an exhaust gas-guiding component with a wall made of a metallic material;
providing a sensor-mounting connector made of a metallic material, which sensor-mounting connector is to be fixed to the wall of the exhaust gas-guiding component, wherein the sensor-mounting connector comprises a sensor-mounting area to be positioned at least partially outside of the exhaust gas-guiding component and a connection area to be positioned such that the connection area meshes with the wall of the exhaust gas-guiding component; and
pressing the sensor-mounting connector to press the connection area against an outer surface of the wall of the exhaust gas-guiding component in a fastening area of the wall, which fastening area is intended for fixing the sensor-mounting connector, and at the same time rotating the sensor-mounting connector about a longitudinal axis of the sensor-mounting connector such that at least the connection area of the sensor-mounting connector penetrates into the metallic material forming the wall of the exhaust gas-guiding component and establishing a connection in substance between the metallic material of the wall and the metallic material of the sensor-mounting connector, wherein the connection in substance is established between the metallic material of the wall and the metallic material of the sensor-mounting connector by a portion of the metallic material of the wall and the metallic material of the sensor-mounting connector melting with the step of pressing the sensor-mounting connector and at the same time rotating the sensor-mounting connector and subsequently solidifying.

20. A process for manufacturing an exhaust system, the process comprising the steps of:
providing an exhaust gas-guiding component with a wall made of a metallic material;
providing a sensor-mounting connector made of a metallic material, which sensor-mounting connector is to be fixed to the wall of the exhaust gas-guiding component, wherein the sensor-mounting connector comprises a sensor-mounting area to be positioned at least partially outside of the exhaust gas-guiding component and a connection area to be positioned such that the connection area meshes with the wall of the exhaust gas-guiding component; and
pressing the sensor-mounting connector to press the connection area against an outer surface of the wall of the exhaust gas-guiding component in a fastening area of the wall, which fastening area is intended for fixing the sensor-mounting connector, and at the same time rotating the sensor-mounting connector about a longitudinal axis of the sensor-mounting connector such that at least the connection area of the sensor-mounting connector penetrates into the metallic material forming the wall of the exhaust gas-guiding component and establishing a connection in substance between the metallic material of the wall and the metallic material of the sensor-mounting connector, wherein the connection in substance is established between the metallic material of the wall and the metallic material of the sensor-mounting connector by a portion of the metallic material of the wall and the metallic material of the sensor-mounting connector melting with the step of pressing the sensor-mounting connector and at the same time rotating the sensor-mounting connector and subsequently solidifying.

* * * * *